United States Patent [19]

Fink et al.

[11] Patent Number: 4,593,536
[45] Date of Patent: Jun. 10, 1986

[54] CARBON DIOXIDE REFRIGERATION SYSTEM

[75] Inventors: James K. Fink, White Bear Lake, Minn.; David H. Habel, Spring Hill, Kans.

[73] Assignee: Burlington Northern Railroad Company, St. Paul, Minn.

[21] Appl. No.: 747,405

[22] Filed: Jun. 21, 1985

[51] Int. Cl.$^4$ ............................................. B60H 3/04
[52] U.S. Cl. ........................................ 62/239; 62/384; 62/388
[58] Field of Search ........................... 62/239, 384, 388

[56] References Cited

U.S. PATENT DOCUMENTS

| | | | |
|---|---|---|---|
| 1,975,177 | 10/1934 | Sherrick | 62/384 |
| 2,325,371 | 7/1943 | Clerc | 62/388 |
| 2,731,807 | 1/1956 | Allyne | 62/388 |
| 3,246,592 | 4/1966 | Rath | 62/239 |
| 3,308,738 | 3/1967 | Heimann | 62/239 |
| 3,335,653 | 8/1967 | Heimann | 62/239 |
| 3,561,226 | 2/1971 | Rubin | 62/66 |
| 3,783,633 | 1/1974 | Glynn et al. | 62/384 |
| 4,248,060 | 2/1981 | Franklin, Jr. | 62/387 |
| 4,299,429 | 11/1981 | Franklin, Jr. | 312/236 |
| 4,376,511 | 3/1983 | Franklin, Jr. | 239/14 |
| 4,381,649 | 5/1983 | Franklin | 62/47 |
| 4,399,737 | 8/1983 | Severson | 62/239 |
| 4,404,818 | 9/1983 | Franklin, Jr. | 62/384 |
| 4,502,293 | 3/1985 | Franklin, Jr. | 62/388 |

Primary Examiner—Ronald C. Capossela
Attorney, Agent, or Firm—Merchant, Gould, Smith, Edell, Welter & Schmidt

[57] ABSTRACT

An apparatus for a non-mechanical refrigerated vehicle is disclosed. A rail car (10) has an enclosed storage area (17). A bunker (20) is positioned proximate the ceiling (16) for containing solid refrigerant flakes. Loading manifold (50), supply manifold (70) and the nozzle (75) transfer and convert the liquid $CO_2$ into the solid refrigerant flakes that are directed into the bunker (22). A mesh screen (30) allows for vapor to exit the bunker (22) to the storage area (17). The screen mesh (30) is positioned proximate the first sidewall (11). The sidewalls (11) and (12) have channels (34) and the floor strips (44) have air flow channels (44e) for the flow of air, including vapor. When the refrigerant flakes sublimate in the bunker (22), the vapor flows from the bunker (22) out the screen mesh (30), down the channel (34) of the first sidewall (11), across the air flow channel (44e) and up the channel (34) of the second sidewall (32), all by convection.

13 Claims, 12 Drawing Figures

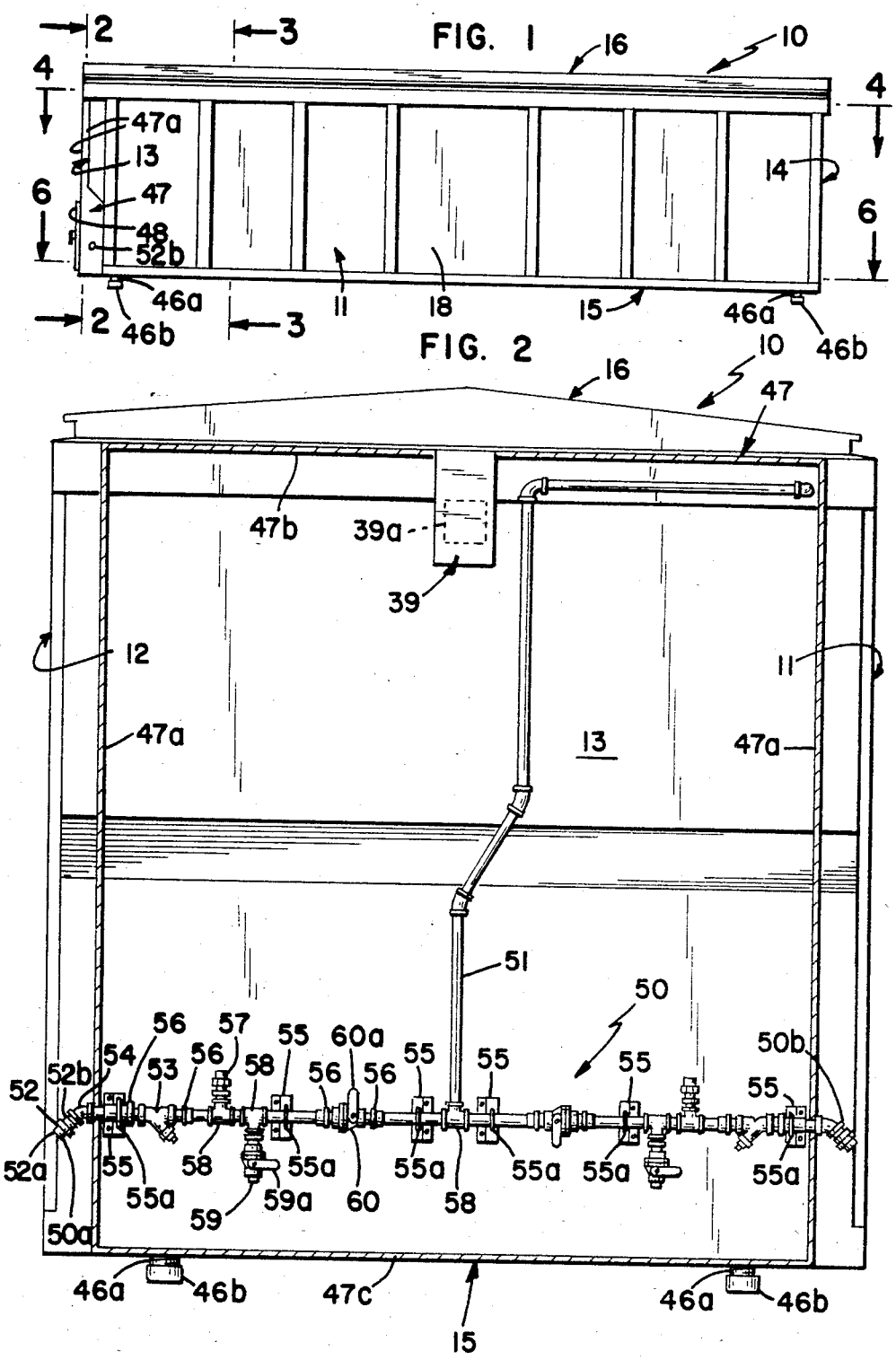

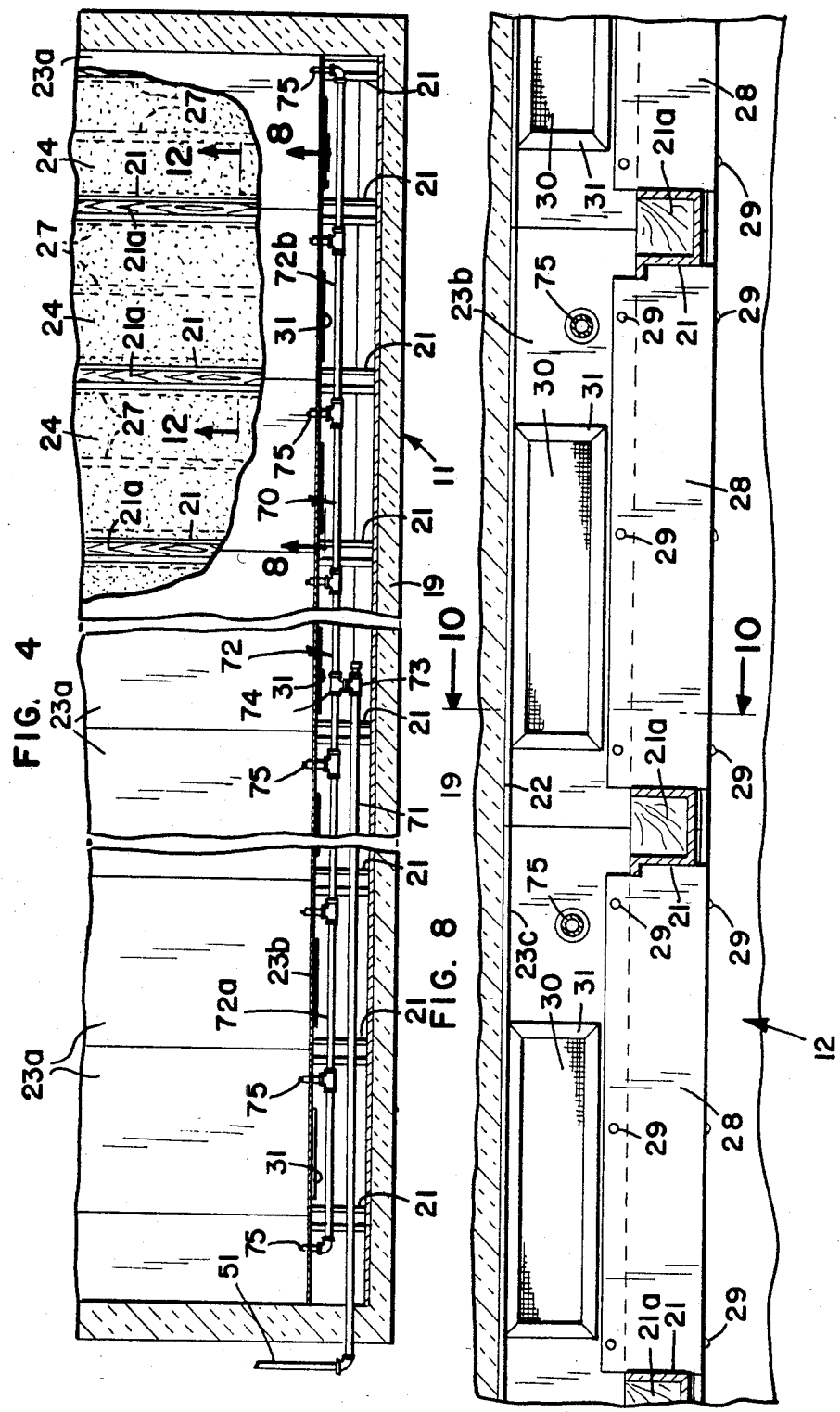

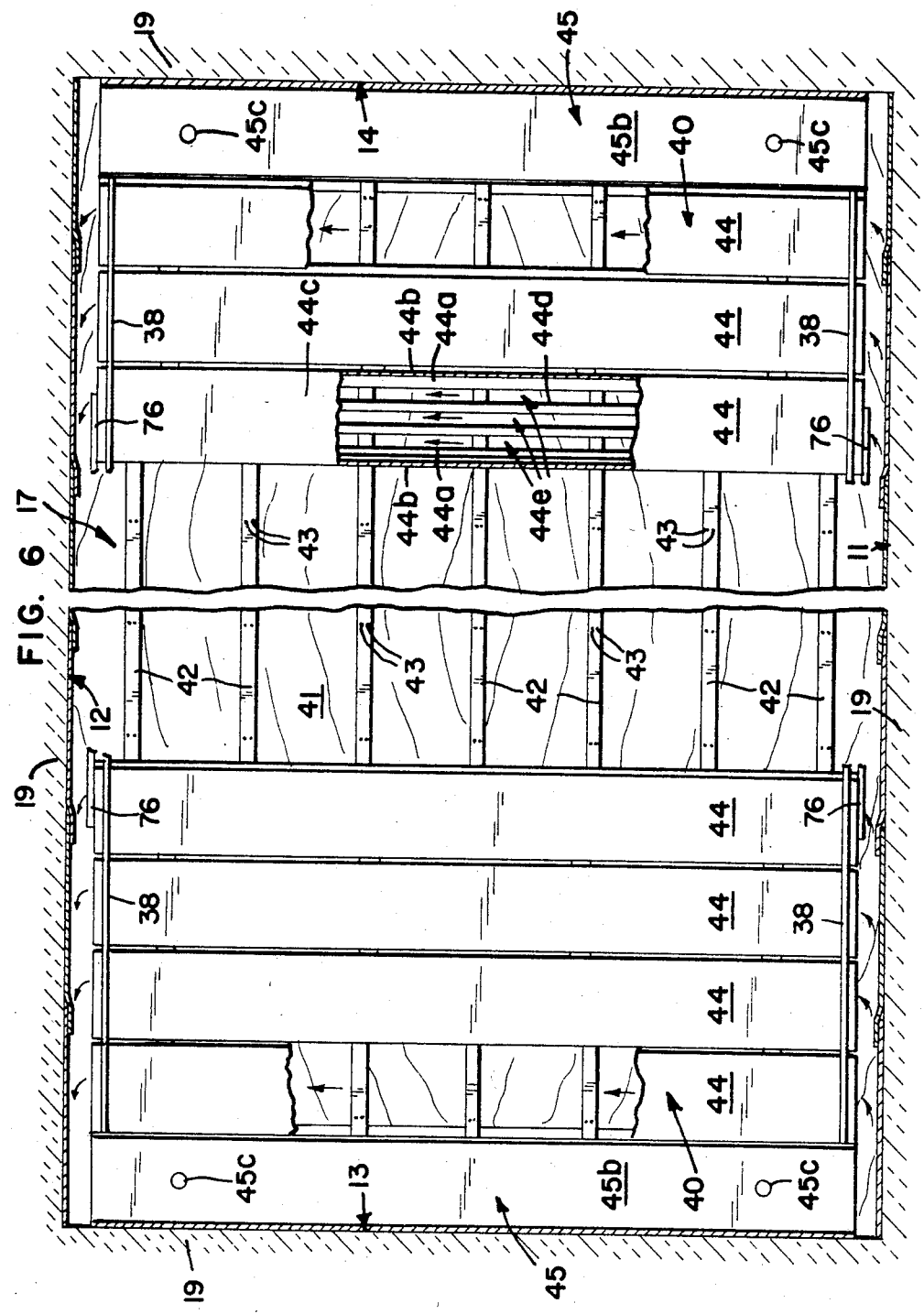

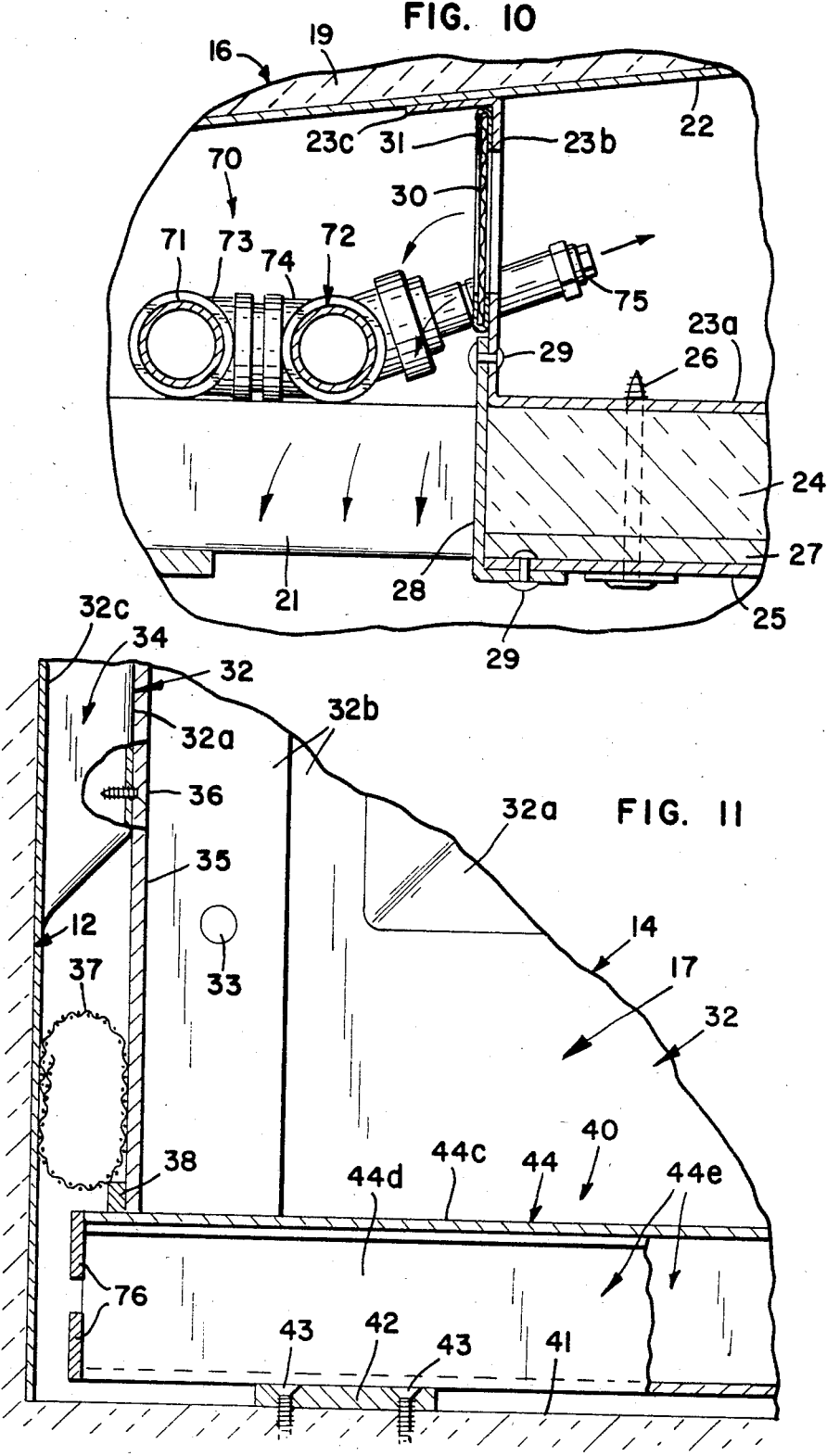

CARBON DIOXIDE REFRIGERATION SYSTEM

BACKGROUND OF INVENTION

1. Field of the Invention

This invention relates generally to refrigerator systems for transportable vehicles, and more particularly to a method and apparatus for utilizing carbon dioxide in a chamber in trucks, rail cars and the like for transporting frozen food without mechanical refrigeration units.

2. Description of the Prior Art

Refrigeration systems for railroad cars and trucks have typically utilized mechanical refrigeration units. In such mechanical refrigeration units it is always of great concern that the units are operational and would not breakdown. The cost of maintenance, both in time and dollars, is often substantial. In addition, over a long haul, it is necessary to frequently check the mechanical refrigeration system to make certain that they are still operational. Further, the mechanical works and fuel add to the overall weight of the rail car.

Non-mechanical refrigeration units have been proposed, but they have been mainly suitable only for trucks. One such non-mechanical refrigeration system is disclosed in U.S. Pat. No. 3,561,266 and was issued to Julius Rubin on Feb. 9, 1971. This non-mechanical refrigeration system utilized liquid $CO_2$ that is converted into solid dry ice, often referred to as snow. Liquid $CO_2$ is injected into one end of a cold plate container at the time refrigeration is desired in a given chamber. The liquid $CO_2$ is converted to snow and $CO_2$ vapor. The cold plate would act as a source of refrigeration for the truck. While the Rubin patent does disclose that such a $CO_2$ cold plate system could be used for railroad cars, such a system has never proved practical.

Another example of a $CO_2$ charged cooling unit is disclosed in U.S. Pat. No. 4,248,060 issued to Paul Franklin, Jr. on Feb. 3, 1981. The Franklin patent discloses a cooling cabinet utilizing $CO_2$ snow and having associated therewith a passageway structure for pumping air to provide for cooling in the area surrounding the cooling unit.

In both of the above noted prior arts units, the $CO_2$ snow was directly used as the refrigerant for the cooling chamber. The vapor of the $CO_2$ snow as it evaporates was typically vented to the outside and not used directly used as the source of cooling.

The present invention addresses the problems of the prior art refrigeration systems.

SUMMARY OF THE INVENTION

The present invention is an apparatus and method for transporting frozen products in a refrigerated rail car, truck or the like. The rail car or truck has a ceiling, floor, two end walls and first and second sidewalls cooperatively connected to form an enclosed storage area. Means for containing solid refrigerant flakes is positioned proximate the ceiling of the enclosed storage area.

Also included is means for transferring liquid $CO_2$ to the container means and means for converting the liquid $CO_2$ into the solid refrigerant flakes and directing the flakes into the container means. Means for allowing the vapor, when the solid refrigerant flakes sublimate, to exit the containment means to the storage area is provided. The exit means is positioned proximate the first sidewall. The sidewalls have means for channeling a flow of air, including the vapor and the floor has means for directing the flow of air from the first sidewall to the second sidewall, wherein when the refrigerant flakes sublimate in the containment means, the vapor flows from the containment means out of the exit means, down the channel means of the first sidewall, across the directing means and up the channel means of the second sidewall, all by convection only.

The method is for refrigerating an enclosed area adapted for transporting frozen cargo, the enclosed area having a bunker position proximate the top of the frozen area. The method includes transferring liquid $CO_2$ to the bunker and converting the liquid $CO_2$ to solid refrigerant flakes. The flakes are directed into the bunker. The vapor, when the flakes sublimate, are allowed to exit the bunker proximate one of the sidewalls of the enclosed area. A convection air flow is set up in the enclosed area wherein the convection flow starts by the vapor leaving the bunker, going down one of the sidewalls, through a channel in a floor and up another sidewall.

BRIEF DESCRIPTION OF THE DRAWINGS

FIG. 1 is a side elevational view of a refrigerated rail car incorporating the present invention.

FIG. 2 is a cross-sectional view of the rail car FIG. 1 taken generally along the lines 2—2.

FIG. 4 is a cross-sectional view of the rail car FIG. 1 taken generally along the lines 4—4.

FIG. 6 is a cross-sectional view of the rail car of FIG. 1 taken generally along the lines 6—6.

FIG. 8 is a cross-sectional view of the rail car of FIG. 4, taken generally along the lines 8—8.

FIG. 10 is a cross-sectional view of the rail car of FIG. 8, taken generally along the lines 10—10.

FIG. 11 is a cross-sectional view of the rail car of FIG. 5, taken generally along the lines 11—11.

DETAILED DESCRIPTION OF THE INVENTION

Figure 3:
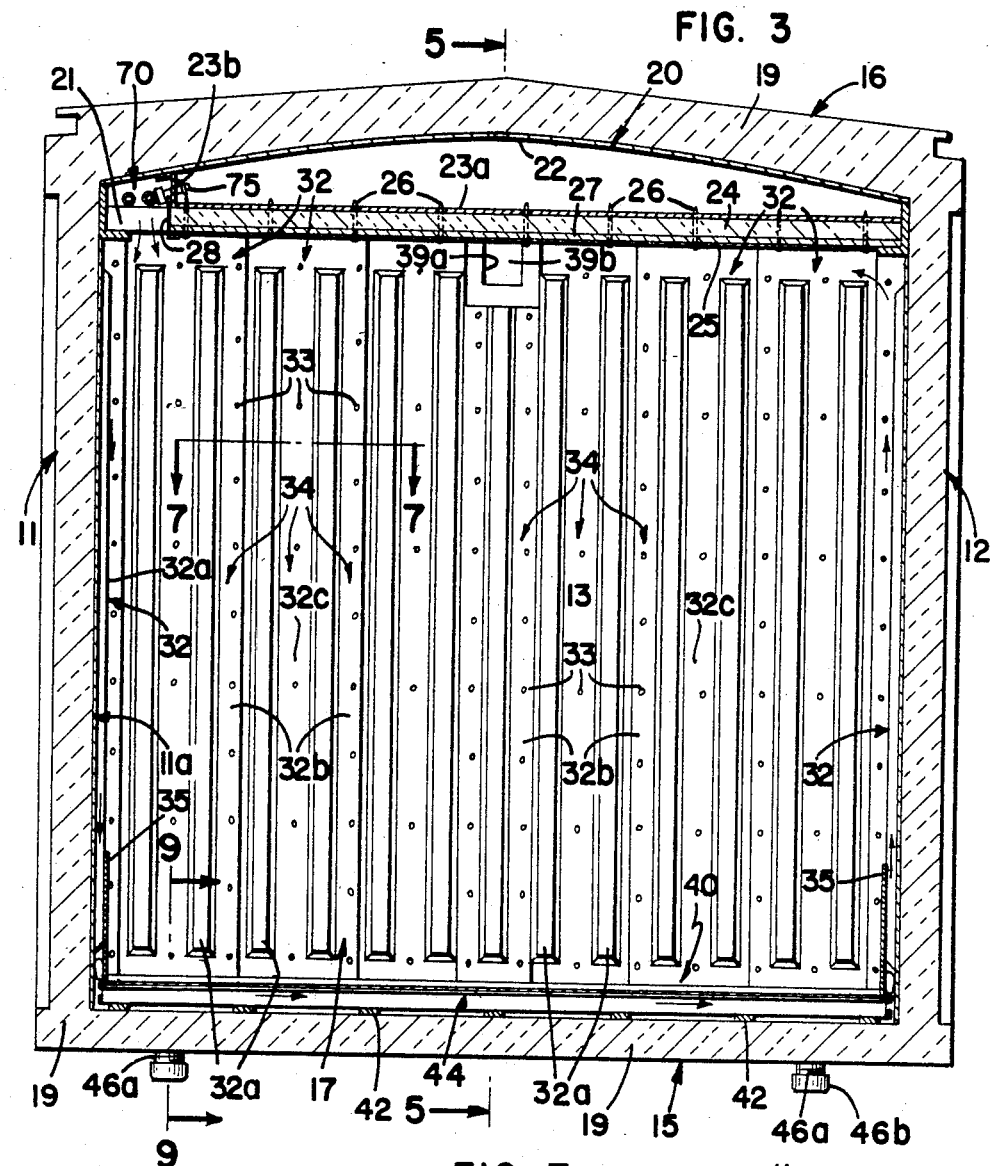
FIG. 3 is a cross-sectional view of the rail car FIG. 1 taken generally along the lines 3—3.

Referring to the figures, wherein like numerals represent like part throughout the several views, there is generally illustrated at 10 a refrigeration rail car. The refrigeration car 10 is shown without wheels or an undercarriage, it being understood that any suitable undercarriage may be utilized. The rail car 10 has a first sidewall 11, second sidewall 12, first endwall 13, second endwall 14, floor 15 and ceiling 16 all cooperatively connected to define a storage area 17 in which the products to be transported are located. Access to the storage area 17 is provided by sliding doors 18, as is well known in the art. A door 18 is positioned proximate the middle of each sidewall 11 and 12. Insulation 19 may be cooperatively connected to or between the walls of the rail car 11 to provide for an insulated storage area. The outer structure of the rail car 10, as just described, is well known in the art and any suitable outer construction of the rail car may be utilized.

Figure 12:
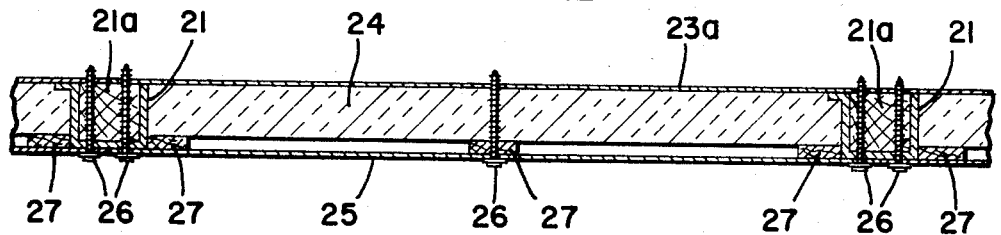
FIG. 12 is a cross-sectional view of the rail car of FIG. 4, taken generally along the lines 12—12.

A bunker, generally illustrated at 20, is constructed proximate the top of the storage area 17. A plurality of U-shaped aluminum beams 21, with a wooden filler 21a, are secured between the sidewalls 11 and 12. The beams 21 provide for support for the bunker 20. The ceiling of the bunker 20 is a sheet of suitable material such as Kemlite BES 485, illustrated at 22. A plurality of ceiling pans 23 are used to construct the remaining outer shell of the bunker 20. As can be seen in FIGS. 3, 8 and 10, the ceiling pans 23 have a base section 23a that extends across the width of the bunker 20. An upwardly extending section 23b is cooperatively connected to the base section 23a and extends to the Kemlite ceiling 22. A top section 23c is cooperatively connected to the section 23b and conforms to the shape of the ceiling 22. The inner wall of the sidewall 12 forms the other wall of the bunker 22. As shown in FIGS. 8 and 10, a portion of the section 23b rests on the beam 21. Insulation 24 is cooperatively connected to the section 23b by means of a sheet of Kemlite 25 and secured by plurality of screws 26. A wooden board filler 27 is positioned between the Kemlite 25 and insulation 24 where the screws 26 are located. FIG. 12 is an enlarged detailed view of this construction. The insulation 24 may be any suitable insulation, such as a 1½ inch thick foam board insulation having a density of from 1.8 to 2.0 pounds. A closure member 28, as shown in FIGS. 8 and 10 is connected to the ceiling pan 23 by means of pop rivets 29 and to the Kemlite panel 25 by pop rivets 29.

The section 23b of the ceiling pans 23 has a mesh screen opening 30 through which the $CO_2$ vapor may exit the bunker, as will be more fully described hereafter. The mesh screen 30 provides the only exit for the vapor from the bunker 22. The mesh screen 30 may be held in position over the opening in the section 23b by any suitable means, such as frame assembly 31. In addition, there is an opening in the section 23b through which nozzles 75 are positioned. As can be seen in FIG. 3, the mesh screen 30 is positioned proximate the sidewall 11. The bunker 22 is of sufficient size to carry a suitable load of $CO_2$ flakes as would be necessary for the desired length of time that the storage area is to be cooled. This would of course depend on the outside temperature of the air, the insulated values of the outer walls of the rail car and other relevant factors. For a typical rail car the bunker may be approximately 52 feet by 8 feet and having sufficient cubic capacity to hold 9,000 pounds of $CO_2$ flakes.

Figure 7:
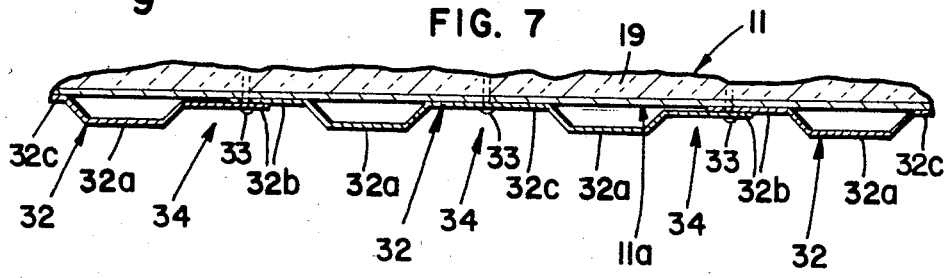
FIG. 7 is a cross-sectional view of the rail car of FIG. 3, taken generally along the lines 7—7.
Figure 5:
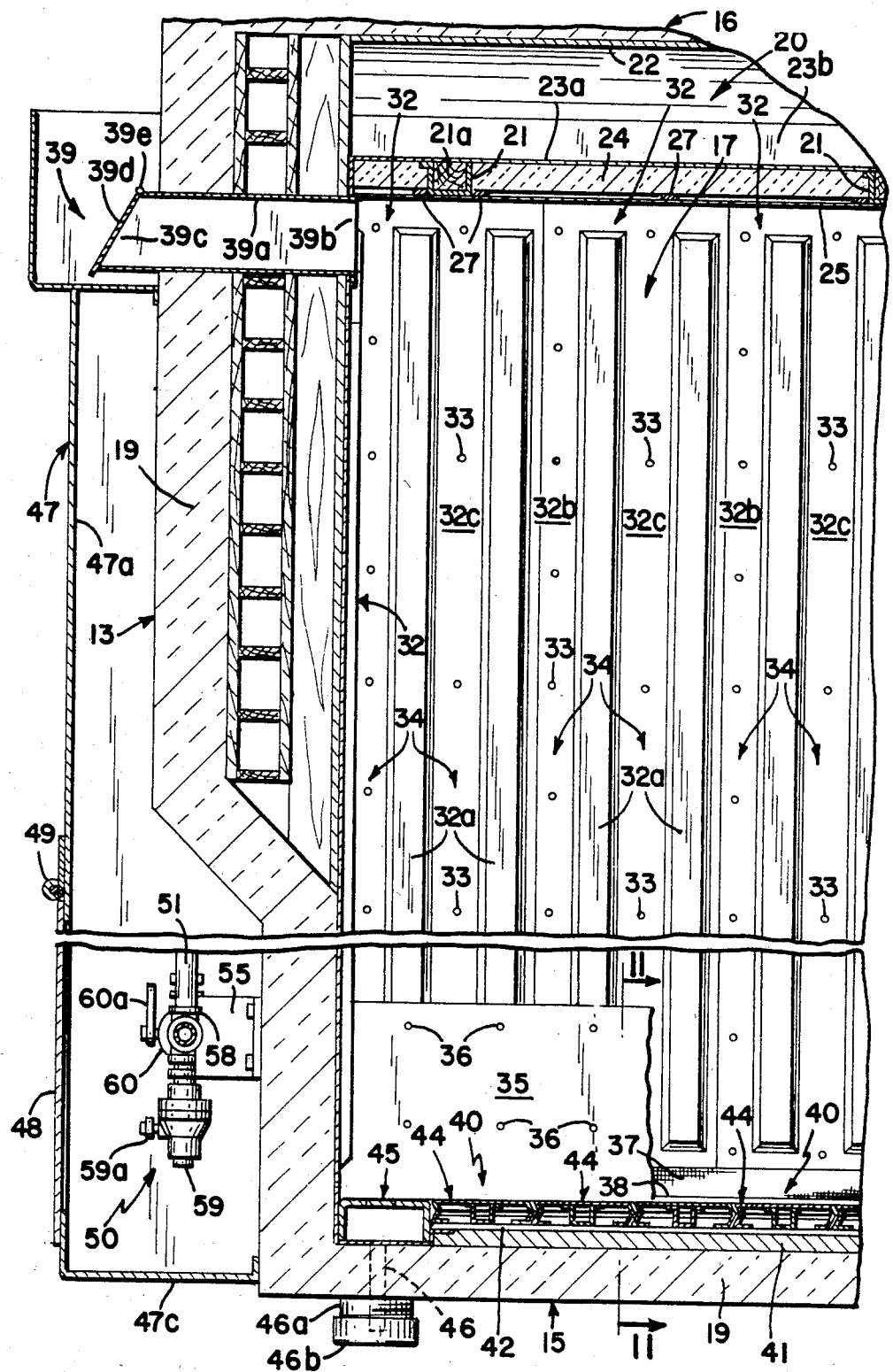
FIG. 5 is a cross-sectional view of the rail car shown in FIG. 3, taken generally along the lines 5—5.

The sidewalls 11 and 12 are of a similar construction and therefore only the construction of the sidewall 11 will be detailed, it being realized that similar construction is used for sidewall 12. As can be seen in FIGS. 5, 7 and 11, attached to the inner wall 11a of the sidewall 11 are a plurality of protruding strips 32. Each strip 32 has two sections 32a that extend into the storage space 17. Flanges 32b are formed on the outside of the strips 32 with an inner flange 32c connecting the two protrusions 32a. The strips 32 are then cooperatively connected to the inner wall 11a by means of an appropriate fastening mechanism, such as rivets 33. The spaces between the protrusions 32a form channels 34. A Kemlite kick board 35 is cooperatively connected to the bottom portions of the strips 32 by screws 36. The protrusions 32a do not extend to the floor of the rail car as shown by the diagonal line in FIG. 11. Below the end of the protrusions 32a is placed a roll of stainless steel or aluminum screening material 37 that is positioned against the inner wall of the kick board 35 and the inner wall 11a. The open mesh nature of screen 37 allows for the passage of air through the screen 37 as air flows through the channels 34. A steel support bar 38 is welded to the floor material (to be more fully described hereafter) to form a support for the bottom of the kick board 35. A caulking material is placed around the perimeter of the support bar 38 to effectively seal between the floor and the Kemlite kick board 35.

The end wall 13 is similarly constructed with strips 32 having protrusions 32a, flanges 32b and 32c that are cooperatively connected to the inner wall 13a of end wall 13, forming channels 34. A vent, which is designated at 39 is positioned in the top portion of the end wall 13. The vent 39 has a hollow tube 39a that may be of any suitable configuration. As shown in the drawings, the tube has a generally square cross section. However, it is understood that other suitable configurations may be used. The tube 39a has a first opening 39b that is always open to the interior of the storage area 17. A second opening 39c is covered by a door 39d that is connected to the tube 39a by a hinge 39e. When the door 39d is in an open position, the opening 39c is vented to the atmosphere.

The other end wall 14 is of a similar construction to the first end wall 13, except there is no vent 39. However, it is understood that it would be possible to have the vent 39 in any one wall 11, 12, 13 or 14 as well as in more than one of the walls.

Figure 9:
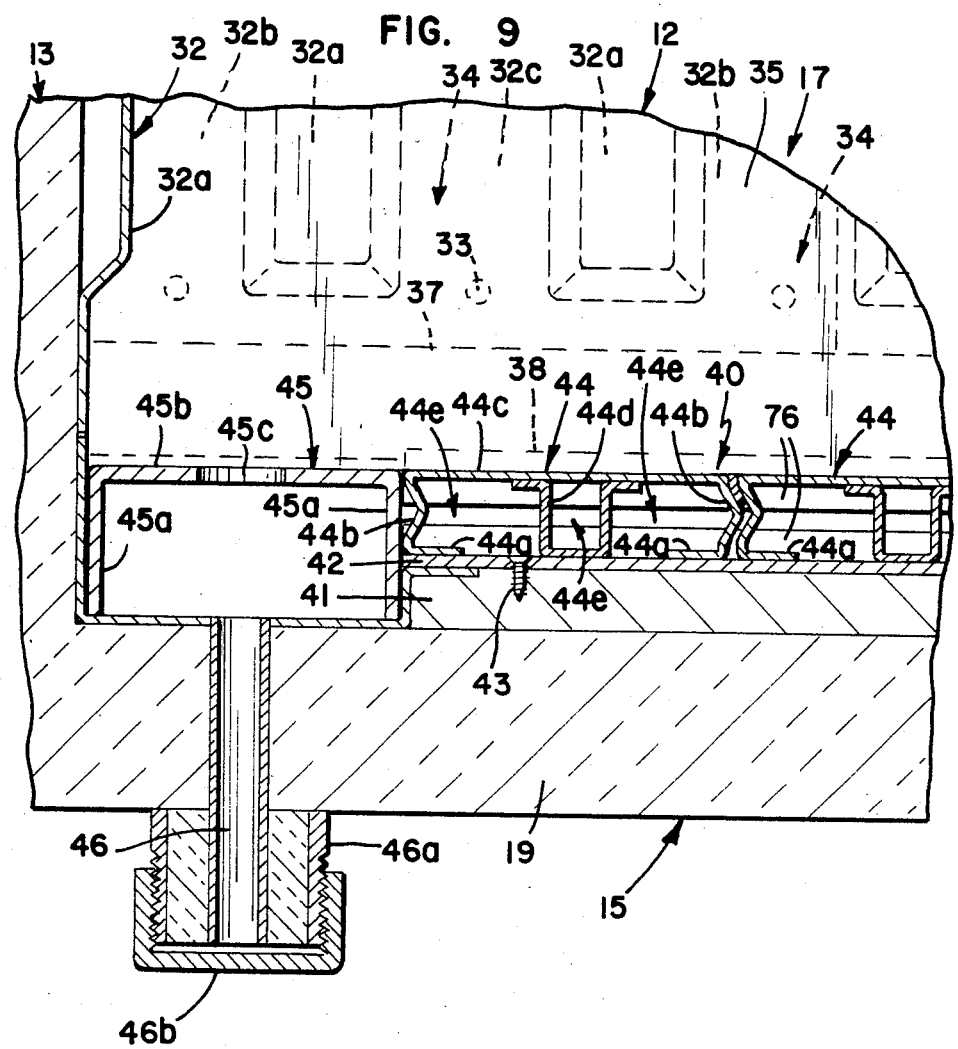
FIG. 9 is a cross-sectional view of the rail car of FIG. 3, taken generally along to lines 9—9.

The flooring, generally designated at 40, for the enclosed area 17 is positioned over the floor 15 and insulation 19. The flooring 40, as shown in FIGS. 5, 6, 9 and 11 consist of a plywood subfloor 41 cooperatively connected over the insulation 19 to the floor 15 in any manner, well known in the art. Metal bars 42 are secured to the plywood 41 by screws 43. The metal bars 42 extend generally the length of the rail car 10. While seven metal bars 42 are shown, it is understood that any suitable number may be utilized. Nailable steel plank flooring 44 is welded in place along the metal bars 42. One such nailable steel floor is National Steel Corporation EPR-211 nailable steel floor. In addition to being welded to the metal bars 42, the top surface of adjacent flooring strips 44 are intermitantly spot welded for added strength. A cross-sectional view of the nailable flooring strip 44 is best seen in FIG. 9. The flooring strip 44 has base section 44a, a generally upright section 44b and a top surface 44c. A generally U-shaped support member 44d is cooperatively connected to the top section 44c. The ends of the flooring strips 44 are not covered, therefore it can be seen that there are air flow channels 44e formed in the interior of the flooring strip 44. As seen in FIGS. 6 and 11, support bars 76 are cooperatively connected to the ends of the strips 44, but only in the location of the door 18. The bars 76 are therefore only in the center of the rail car 10. Further, there is a space between the two bars 76 to allow for air flow to channels 44e. Adjacent each end wall 13 and 14 is an inverted U-shape drainage member 45. As shown in FIG. 9, the drainage member has two downwardly depending flanges 45a and a cross member 45b. The cross member 45b has a plurality of drainage holes 45c. It is understood that any suitable drainage member 45 may be utilized, such as a drainage member that would be in the general configuration of a rack having an open mesh top to allow for even more drainage through the open mesh. The inner cavity of the drainage member 45 is open to a drainage tube 46 that has a threaded base member 46a and a removable threaded cap 46b. It is understood that the drains are open and used only during cleaning, otherwise they are plugged and insulated during shipment.

The loading manifold, designated generally as the 50, is shown in FIG. 2. The loading manifold 50 is positioned on the rail car 10 such that the manifold may be accessed from either side of the rail car 10. The loading manifold 50 has a first loading end 50a and a second loading end 50b. Both loading ends 50a and 50b are in fluid communication with the supply line 51. The supply line 51 is in fluid communication with the supply manifold, generally designated as 70 as shown in FIG. 4, and will be more fully described hereafter. Both the first loading end 50a and second loading end 50b are connected to the supply line 51 in the same manner. Therefore, only the connection from the first loading end 50a to the supply line 51 will be described, it being realized that a similar connection connects the second end 50b to the supply line 51.

The first end 50a of the loading manifold 50 includes an adaptor 52 having a male end 52a and a female end 52b. The male end 52a can be connected to the source of liquid refrigerant (not shown). The source of liquid refrigerant may be any source, well known in the art. It is preferred that a tank of $CO_2$ be available proximate the railroad tracks and a hose simply be brought from the tank to the loading ends 50a or 50b. It is also possible to use a mobile tank for smaller uses or in more remote locations. A strainer 53 is cooperatively connected to the adaptor 52 by means of an elbow 54 and adaptor 56. The loading manifold 50 is cooperatively connected and supported to the railcar 10 by means of suitable mounting brackets 55. The mounting brackets 55 have mounting members 55a which encircle and support the loading mainfold 10. A pressure relief valve 57 is cooperatively connected to the other end of the strainer 53 by means of a tee 58 and adaptor 56. A bleed off valve 59, having a handle 59a, is cooperatively connected to the pressure release valve 57 by means of a tee 58 and adaptor 56. A first end of a shut off valve 60, having a handle 60a, is cooperatively connected to the bleed off valve 59 by an adaptor 56 and the other end of the shut off valve 60 is cooperatively connected to the supply line 51 by an adaptor 56 and tee 58.

The supply line 51 is cooperatively connected to the supply manifold 70. The supply manifold 70 includes a supply pipe 71 and a distribution pipe 72. The supply pipe 71 is cooperatively connected to the top portion of supply line 51 of the railcar 10. The supply pipe 71 extends approximately to the center of the rail car 10. A tee 73 is cooperatively connected to one end of the supply pipe 71 proximate to the center of the railcar. The tee 73 is in turn cooperatively connected to the tee 74 which is located proximate the center of the distribution pipe 72. The distribution pipe 72 includes a first section 72a that extends proximate one end of the railcar 10 and a second section 72b that extends proximate the other end of the rail car 10. Nozzles 75 are cooperatively connected at approxmately four foot intervals along the distribution pipe 72. The nozzles 75 are simple brass plugs with drilled holes or conventional $CO_2$ forming heads or nozzles. The number of the nozzles 75 will of course be dependent upon the overall length of the bunker that is filled with $CO_2$ snow. In a preferred embodiment where the supply pipe 72 is 52 feet long, the three nozzles adjacent the distal end first section 72a have an orifice of 0.161 inches and the remaining nozzles of section 72a and all of 72b have orifices of 0.156 inches. The nozzles 75 are supported in position by a suitable mounting bracket and generally are positioned at an upward angle of approximately 20° above the horizon for shooting the $CO_2$ snow into the bunker.

The supply manifold 50 is positioned outside of the enclosed area 17 at any suitable location. One manner of so doing, is shown in FIGS. 2 and 5. A compartment 47 is constructed adjacent the end wall of the rail car 10. Compartment 47 has three sidewall 47a and a top 47b and bottom 47c. An access door 48 is cooperatively connected to the one of the side walls 47a by means of a hinge 49 to provide access to the supply manifold 50.

The present invention is also well suited for adapting existing refrigerated cars that have previously been using mechanical system. The interiors of the cars may be suitable converted to conform to that of the present invention. In so doing, it would be possible to use the engine room of the mechanical refrigerator cars to house the supply manifold 50, as there is no longer any need for the mechanical workings with the present invention. The sidewalls 47a of the compartment 47 have openings through which the ends 50a and 50b protrude, so that they may be easily accessable for being filled with the liquid $CO_2$.

In operation, a source of liquid $CO_2$ is brought up along either side of the rail car 10. The source of liquid $CO_2$ is attached to either of the ends 50a or 50b. Handle 60a is rotated to an open position, allowing the liquid $CO_2$ to flow through the loading manifold 50, through the supply line 51 and into the supply manifold 70. The liquid $CO_2$ flows from the supply line 51 into the supply pipe 71 where it then flows to the distribution pipe 72. The liquid $CO_2$ then flows to all sections of the distribution pipe 72 and flows from the distribution pipe 72 into the nozzles 75. The liquid $CO_2$, as it exits the nozzles 75 turns to refrigerant flakes, commonly referred to as snow, and enters the bunker 20. Snow will continue to flow out of the nozzle 75 until the area in front of the nozzle 75 is filled and the back pressure, caused by the snow against the nozzle, will cause the liquid $CO_2$ to quit flowing out of the nozzle 75. Depending upon the supply manifold 70 used, it may be necessary to adjust the orifices of the nozzles 75 to provide for even distribution throughout the bunker 22. To obtain adaquate distribution, it is only necessary to have slightly different sized orifices to provide for better distribution. In the present case, it was found that by increasing the orifices of the three end nozzles a better distribution was obtained. However, it is understood that based on this specific configurations of the bunker and supply manifold, different sized orifices may be necessary throughout the supply manifold 70. During the loading of the $CO_2$, sufficient vapor pressure may build up within the enclosed storage area so as to activate the vent 39. A build up of pressure will cause the door 39d to lift off of the bottom portion of the tube 39a, thereby venting the interior of the storage area to the atmosphere. Due the typical construction of rail cars, it has been found that during the transportation of the rail car, the vent 39 is not actuated. This is because there is sufficient leakage throughout the car to prevent the build up of vapor pressure. However, if in fact the vapor pressure does build up during the transportation of the rail car, the vent 39 would be actuated. It is understood that before the $CO_2$ is loaded into the storage area 17, that the cargo to be transported is first loaded into the rail car. Once the storage area is fully loaded, the sliding doors 18 can be closed to prevent further access by persons and the $CO_2$ may then be loaded. In such a manner, the $CO_2$ vapor is not in the enclosed area when a person is present. Correspondingly, for safety reasons, when the doors are opened after transport, it is necessary to leave the doors open for a sufficient amount of time to allow the carbon dioxide vapor to exit the enclosed storage area 17 before a person enters the storage area 17.

After a sufficient amount of $CO_2$ has been loaded into the bunker 22, the rail car, along with its frozen cargo, is ready to be moved. The amount of $CO_2$ used will of course depend upon the many conditions previously discussed in this specification. However, typically 9,000 pounds of $CO_2$ snow will keep the cargo frozen from 7 to 10 days. It is also understood that the refrigerator car, could also be charged mid trip to allow for additional $CO_2$ snow to be placed into the bunker.

When the bunker is first charged with $CO_2$ snow, the flooring strips 44 are typically warm and will act as a heat sink to assist in starting the convection flow. As the $CO_2$ snow sublimates, the vapor from the $CO_2$ will exit the mesh screen openings 30, as indicated by the arrows in FIG. 10 and proceed down the sidewall 11 through channels 34. The flow of vapor and air shown by arrows throughout the drawings, continues down the channels 34 behind the kick board 35 and proceeds through the air flow channels 44a of the nailable flooring strips 44, as shown by the arrows in FIG. 6. The air flow then continues up the channels 34 of the second sidewall 12 behind the kick plate 35 and continues up through the channels 34 until it reaches the top of the storage area where it then proceeds across the top of the ceiling to the first sidewall 11. The vapor exiting the screen 30 is the start of the strong convection current set up by the present invention. The vapor, exiting the screen 30 takes a portion of the air in the enclosed area 17 and disipates throughout the enclosed area 17 creating the BTU's for refrigeration.

The bunker 22 has insulation 24 which assists in preventing the bunker 22 from becoming a direct source of refrigerant. Instead, the refrigerating effect is obtained by the convection flow of the vapor, after the $CO_2$ snow has sublimated.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

We claim:

1. A refrigerated transporation vehicle comprising:
   (a) ceiling, floor, two end and first and second sidewalls cooperatively connected to form an enclosed storage area;
   (b) means for containing solid refrigerant flakes, said containing means positioned proximate said ceiling and extending substantially the entire length of said vehicle;
   (c) means for providing transfer of liquid $CO_2$ to said containing means and means for converting the liquid $CO_2$ into the solid refrigerant flakes and directing the flakes into said containing means;
   (d) means for allowing vapor, when the solid refrigerant flakes sublimate, to exit said containment means to said storage area, said exit means positioned proximate said first sidewall said exit means comprising a plurality of openings extending along said containing means;
   (e) said sidewalls having means for channeling a flow of air, including said vapor; and
   (f) said floor having means for directing the flow of air from said first sidewall to said second sidewall, wherein when said refrigerant flakes sublimate in said containing means, said vapor flows from said containing means out said exit means, vertically down said channel means of said first sidewall, across said directing means and vertically up said channel means of said second sidewall, all by convection, whereby no moving parts are required to effect refrigeration of said vehicle during transit.

2. The refrigerated transportation vehicle of claim 1, wherein the vehicle is a rail car.

3. The refrigerated rail car of claim 2, wherein said channeling means of the sidewalls is a corrugated wall having a plurality of alternating channels and protrusions.

4. The refrigerated rail car of claim 2, wherein said containment means is a bunker.

5. The rail car of claim 4, wherein the bunker comprises a plurality of ceiling pans, each pan extending across the width of the rail car.

6. The refrigerated rail car of claim 2, wherein said floor has means for drainage adjacent said ends.

7. The refrigerated rail car of claim 2, wherein said sidewalls are sealed along their intersection with said floor.

8. The rail car of claim 2, wherein said sidewalls have a kick plate, cooperatively connected adjacent the floor and a screen member between said kick plate and said sidewalls.

9. The refrigerated rail car of claim 2, further comprising a vent in fluid communication with said enclosed storage area for venting the interior of said storage area when the vapor from the sublimating refrigerant flakes is excessive.

10. The rail car of claim 9, when said vent has a hinge door that is closed by gravity and opened only when the pressure inside said enclosed storage area exceeds a pre-determined pressure.

11. The refrigerated transportation vehicle of claim 1 wherein said converting means comprises a manifold having a plurality of nozzles extending substantially along the length of said bunker, said nozzles having orifices sized to provide even distribution throughout said containing means.

12. A refrigerated rail car comprising:
   (a) ceiling, floor, two end and first and second sidewalls cooperatively connected to form an enclosed storage area;
   (b) a bunker for containing solid refrigerant flakes, said bunker positioned proximate said ceiling and extends substantially the entire length of said rail car;
   (c) means for providing transfer of liquid $CO_2$ to said bunker and means for converting the liquid $CO_2$ into the solid refrigerant flakes and directing the flakes into said bunker;
   (d) means for allowing vapor, when the solid refrigerant flakes sublimate, to exit said bunker to said storage area, said exit means positioned proximate said first sidewall said exit means comprising a plurality of openings extending along said bunker;

(e) said sidewalls having corrugated walls having a plurality of alternating channels and protrusions for channeling a flow of air, including said vapor;

(f) said floor having means for directing the flow of air from said first sidewall to said second sidewall, wherein when said refrigerant flakes sublimate in said bunker, said vapor flows from said bunker out said exit means, down said channel means of said first sidewall, across said directing means and up said channel means of said second sidewall, all by convection;

(g) a vent in fluid communication with said enclosed storage area for venting the interior of said storage area when the vapor from the sublimating refrigerant flakes is excessive, said vent having a hinge door that is closed by gravity and opened only when the pressure inside the enclosed storage area exceeds a pre-determined pressure, whereby no moving parts are required to effect refrigeration of said rail car during transit.

13. The refrigerated railcar of claim 12 wherein said converting means comprises a manifold having a plurality of nozzles extending substantially along the length of said bunker, said nozzles having orifices sized to provide even distribution throught out said bunker.

* * * * *